UNITED STATES PATENT OFFICE.

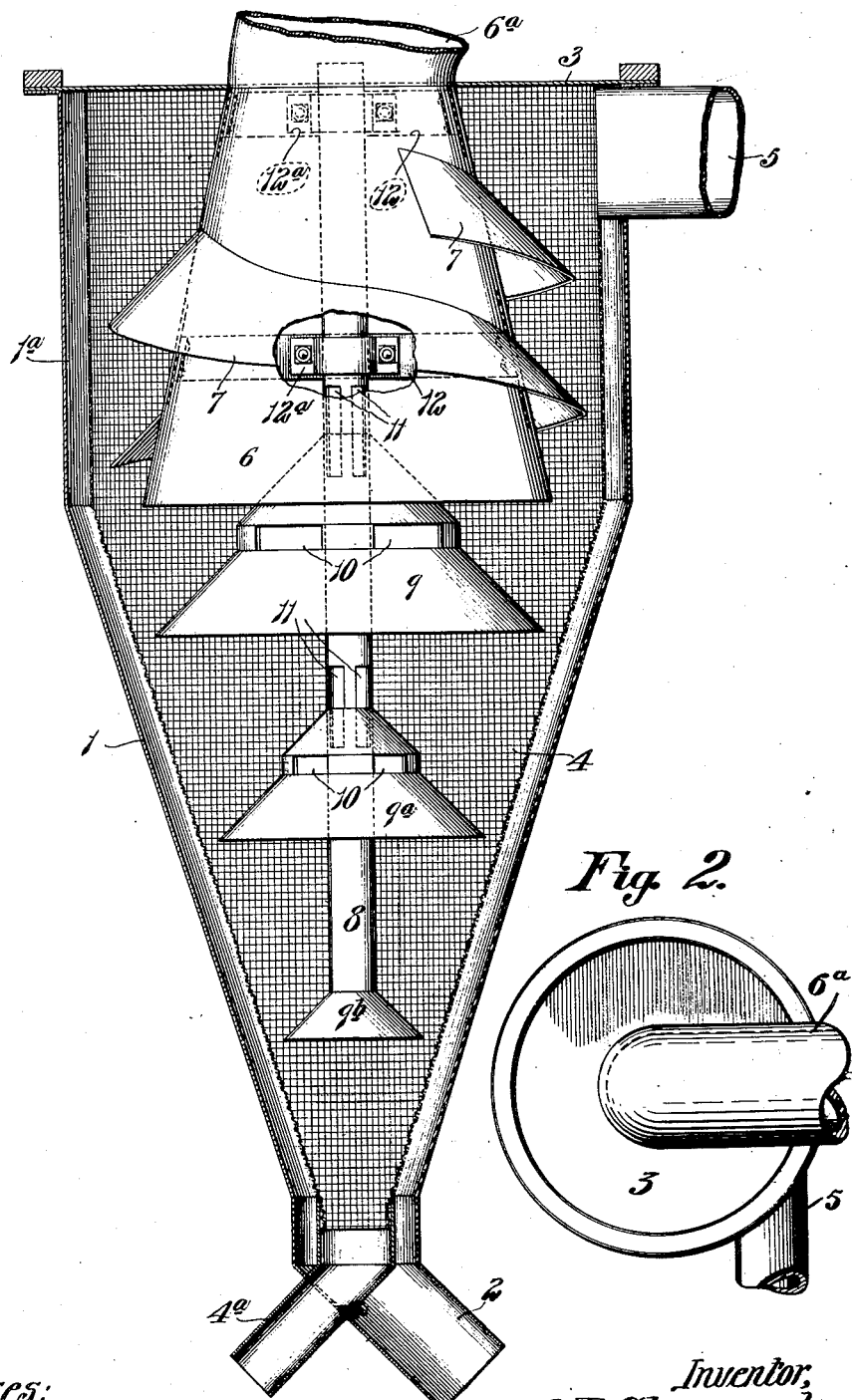

ASHLEY T. SHEWARD, OF ST. LOUIS, MISSOURI, ASSIGNOR TO WILLIAMS PATENT CRUSHER & PULVERIZER COMPANY, OF ST. LOUIS, MISSOURI, A CORPORATION OF MISSOURI.

DUST COLLECTOR AND SEPARATOR.

940,827.

Specification of Letters Patent.    Patented Nov. 23, 1909.

Application filed May 18, 1908.   Serial No. 433,492.

*To all whom it may concern:*

Be it known that I, ASHLEY T. SHEWARD, a citizen of the United States, residing at St. Louis, Missouri, have invented a certain new and useful Improvement in Dust Collectors and Separators, of which the following is a full, clear, and exact description, such as will enable others skilled in the art to which it appertains to make and use the same, reference being had to the accompanying drawings, forming part of this specification, in which—

Figure 1 is a view partly in elevation and partly in vertical section of an apparatus constructed in accordance with my invention. Fig. 2 is a plan view of a dust collector and separator of my improved construction.

This invention relates to dust collectors and separators, and particularly to that type which are generally termed Cyclone dust collectors.

The main object of my invention is to provide a dust collector and separator which is so constructed that the low-pressure outgoing current of air will be protected from the high-pressure incoming current of dust-laden air.

Another object of my invention is to provide a dust collector and separator comprising an approximately inverted conical-shaped screening member arranged inside of a casing, means for introducing a current of dust-laden air into the upper end of said member, and means for causing said current to travel downwardly into said screening member and then pass upwardly through a conduit arranged at approximately the center of said member after the dust has been separated from the air. And still another object of my invention is to provide a dust collector and separator comprising a cylindrical-shaped casing, into the upper end of which a current of dust-laden air is introduced, a screen arranged inside of said casing, and means for retarding the air in its passage down into said casing and also directing the particles of dust in the air onto said screening member.

Other objects and desirable features of my invention will be hereinafter pointed out.

Referring to the drawings which illustrate the preferred form of my invention, 1 designates an approximately inverted conical-shaped casing provided at its lower end with a discharge conduit 2 and at its upper end with a cylindrical-shaped portion 1ª having a closed top 3. A screening member 4 which conforms to the shape of said casing is arranged inside of same and is spaced away from the casing so as to permit the fine particles of dust which are forced through said screening member to pass into the discharge conduit 2 at the lower end of the casing, said screening member being provided at its lower end with a discharge conduit 4ª through which the coarse particles of dust pass.

A feed pipe or conduit 5 projects tangentially into the upper end of the screening member for introducing a current of dust-laden air into same, and means is arranged inside of said screening member for retarding the downward passage of the air and deflecting the particles of dust onto said screening member.

In the construction herein shown a hollow member 6, preferably a frustum of a cone, is arranged inside of the screening member 4, said member 6 projecting through the top 3 of the casing and being provided with a discharge pipe 6ª. The air from which the dust has been removed passes out of the casing through this frustum-shaped member 6 so that said member forms a partition that protects the low-pressure outgoing current of air from the high-pressure incoming current of air which enters through the feed pipe 5. On the exterior of the partition member 6 is a spiral flange 7 arranged at an angle of approximately 45° and operating to retard the downward passage of the incoming current of air and also direct the particles of dust in the air onto the screening member 4.

A vertically disposed pipe 8 extends longitudinally through the screening member 4 into the partition member 6, as shown in dotted lines in the drawing, and a plurality of hollow conical-shaped devices 9, 9ª and 9ᵇ of gradually decreasing dimensions are mounted on said pipe so as to direct the particles of dust onto the screening member 4 and also form partitions that protect the rising current of low-pressure air from the dust and air that is traveling toward the lower end of the casing.

The conical-shaped members 9 and 9ª are provided with air ducts 10 and the pipe 8 is also provided with air ducts 11 located adjacent the upper ends of the conical-shaped devices 9 and 9ª to permit the air from which the dust has been removed to rise freely into the air discharge pipe 6ª at the top of the casing.

With an apparatus of this construction the dust-laden air which enters the upper end of the casing through the tangentially disposed feed conduit 5 will take a downward path adjacent the sides of the casing and the low-pressure outgoing current of air will rise through the center of the casing into the air discharge pipe 6ª. The air ducts 10 and 11 permit the outgoing air to move in the line of least resistance and thus travel upwardly to the discharge pipe 6ª. The spiral flange 7 and the conical-shaped devices on the pipe 8 prevent the incoming current of air from rushing too swiftly down into the casing and said members also direct the particles of dust onto the screening member.

As previously stated, the member 6 prevents the incoming current of air from coming in contact with the low-pressure outgoing current of air, and the conical-shaped devices 9, 9ª and 9ᵇ also perform a similar function so that a very efficient dust collector and separator is produced.

I prefer to mount the pipe 8 in such a manner that it can be adjusted vertically so as to vary the distance between the outer edges of the conical-shaped devices 9, 9ª and 9ᵇ and the interior of the casing. In the construction herein shown, the pipe 8 is arranged between clamping members 12 carried by the partition member 6 and coöperating clamping members 12ª connected to the members 12. When the pipe 8 is moved downwardly the edges of the devices 9, 9ª and 9ᵇ will be brought closer to the casing and thus reduce the size of the passageway through which the incoming air has to travel to reach the lower end of the casing. When the pipe 8 is moved upwardly the edges of said devices will be spaced farther away from the casing and thus increase the size of the passageway through which the incoming air travels.

Having thus described my invention, what I claim as new and desire to secure by Letters Patent is:

1. In a dust collector and separator, a casing, an air discharge pipe leading from the upper end thereof, a supply pipe for introducing the dust-laden air into the upper end of the casing, a screen arranged inside the casing for separating the dust from the air, a spirally disposed flange on the air discharge pipe for causing the air introduced into the casing to follow the whirling downward path close to the wall of the casing, a small pipe depending from the air outlet pipe, means within the air outlet pipe whereby said small pipe is adjusted vertically and a plurality of conical-shaped members carried by said small pipe.

2. An apparatus of the character described, comprising a casing having its upper end closed, a screening member arranged inside of said casing and spaced away therefrom, means for introducing a current of dust-laden air into the upper end of said casing, a hollow partition member arranged inside of said casing at approximately the center of same and provided with a discharge opening through which the air passes after the dust has been removed therefrom, and a downwardly projecting flange arranged spirally on the outer surface of said partition member for retarding the downward passage of the air and for deflecting the particles of dust onto said screening member, said flange being so formed that a space is produced between its outer edge and the inner surface of the screening member to permit the air to follow a downward path close to the sides of the casing; substantially as described.

3. An apparatus of the character described, comprising a casing provided at its upper end with a discharge opening and at its lower end with a discharge conduit, a feed pipe extending tangentially into said casing for introducing a current of dust-laden air into same, a plurality of superimposed hollow cone-shaped members arranged inside of said casing, the topmost member being provided with an opening that communicates with the discharge opening at the upper end of the casing, and means in said cone-shaped members for permitting air to pass upwardly through same; substantially as described.

4. An apparatus of the character described, provided with a casing having its upper end closed, a screening member arranged inside of said casing, a feed pipe entering the upper end of said casing for introducing a current of dust-laden air into same, a hollow frustum of a cone arranged inside of said casing adjacent the top thereof and provided with a discharge opening, a vertically disposed pipe arranged inside of said casing, and a plurality of hollow conical-shaped devices mounted on said pipe, said pipe and some of said devices being provided with air ducts; substantially as described.

5. An apparatus of the character described, comprising a casing having its upper end closed and provided with a lower contracted portion that communicates with a discharge pipe, a feed pipe extending into the upper end of said casing for introducing a current of dust-laden air into same, a screening member arranged inside of said casing and spaced away from the sides thereof, a plurality of hollow approximately conical-shaped members of different diameters arranged inside of said screening member one above the other, the topmost conical-shaped member being open at its upper end and the other cone-shaped members being so constructed that air can pass upwardly inside of same to said topmost member, and a discharge pipe communicating with said topmost member; substantially as described.

6. An apparatus of the character described, comprising an approximately inverted conical-shaped casing provided at its upper end with an air discharge opening, a screening member conforming to the shape of said casing and arranged inside of same, said screening member being spaced away from the casing, a feed pipe communicating with the upper end of said screening member for introducing a current of dust-laden air into same, an approximately conical-shaped hollow member arranged inside of said screening member adjacent said feed pipe and having its upper end communicating with the air discharge opening in the casing, and a downwardly projecting flange extending spirally around said conical-shaped member and having its outer edge spaced away from said screening member, for causing the air to follow a downward path at the sides of the casing and then return upwardly through the center of the casing to the discharge opening at the upper end of the casing; substantially as described.

7. An apparatus of the character described, comprising an approximately inverted conical-shaped casing having its upper end closed, a screening member conforming to the shape of said casing and arranged inside of same, said screening member being spaced away from the casing, a feed pipe extending tangentially into the upper end of said screening member for introducing a current of dust-laden air into same, an approximately conical-shaped member arranged inside of said screening member adjacent said feed pipe and having its upper end open, a downwardly projecting spiral flange on the exterior of said conical-shaped member, a vertically disposed pipe extending through said casing, and a plurality of hollow conical-shaped devices mounted on said pipe, said pipe and some of said devices being provided with air ducts; substantially as described.

8. An apparatus of the character described, provided with an inverted cone-shaped casing, a discharge pipe leading from the upper end thereof, means for introducing a current of dust-laden air into said casing, and a plurality of vertically adjustable, superimposed hollow cone-shaped members of different size arranged inside the casing, certain of which members are so constructed that air can circulate through the same and finally pass through the discharge pipe at the upper end of said casing.

9. An apparatus of the character described, comprising a casing having its lower end contracted, a plurality of hollow cone-shaped partition members of different size arranged one above the other inside of said casing, means for introducing a current of dust-laden air into the upper end of the casing, and means for simultaneously adjusting all of said partition members vertically to vary the space between their peripheral edges and the inside of the casing; substantially as described.

10. An apparatus of the character described, comprising an approximately conical-shaped casing, an outlet pipe leading from the upper end of said casing, a spiral deflector on the exterior of said outlet pipe within the casing, a plurality of conical-shaped devices of different size arranged inside of the casing one above the other, means connecting and supporting said devices and which means may be adjusted vertically to vary the space between their edges and the casing, and means for introducing a current of dust-laden air into the upper end of said casing; substantially as described.

11. An apparatus of the character described, comprising an approximately inverted conical-shaped casing, a vertically adjustable hollow pipe arranged inside of said casing and provided with openings that permit air to circulate up through same, a plurality of laterally projecting partition members of different diameters arranged one above the other on said pipe, some of said members being provided with air ducts that permit air to circulate up through said members, and means for introducing a current of dust-laden air into the upper end of said casing; substantially as described.

12. In an apparatus of the class described, a casing, an air discharge pipe leading from the upper end thereof, a pipe for introducing the dust-laden air into the upper end of the casing, a vertically adjustable pipe depending from the central portion of the air discharge pipe, and a plurality of conical-shaped members of different sizes carried by and arranged one above the other on the vertically adjustable pipe.

In testimony whereof I hereunto affix my signature in the presence of two witnesses, this thirteenth day of May 1908.

ASHLEY T. SHEWARD.

Witnesses:
 MILTON F. WILLIAMS,
 GEORGE BAKEWELL.